(12) United States Patent
Bireaud et al.

(10) Patent No.: US 12,043,105 B2
(45) Date of Patent: Jul. 23, 2024

(54) COOLING ASSEMBLY FOR A MOTOR VEHICLE

(71) Applicant: Valeo Systemes Thermiques, Le Mesnil Saint-Denis (FR)

(72) Inventors: Fabien Bireaud, Le Mesnil Saint-Denis (FR); José Trindade, Le Mesnil Saint-Denis (FR); Rémi Tournois, Le Mesnil Saint-Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 237 days.

(21) Appl. No.: 17/605,148

(22) PCT Filed: Apr. 20, 2020

(86) PCT No.: PCT/EP2020/061034
§ 371 (c)(1),
(2) Date: Oct. 20, 2021

(87) PCT Pub. No.: WO2020/216727
PCT Pub. Date: Oct. 29, 2020

(65) Prior Publication Data
US 2022/0194212 A1    Jun. 23, 2022

(30) Foreign Application Priority Data

Apr. 26, 2019 (FR) .................................. FR1904424

(51) Int. Cl.
*B60K 1/00* (2006.01)
*B60K 11/04* (2006.01)
*B60K 11/08* (2006.01)

(52) U.S. Cl.
CPC .............. *B60K 11/04* (2013.01); *B60K 11/08* (2013.01)

(58) Field of Classification Search
CPC ........ B60K 11/04; B60K 11/08; B60K 13/02; B60K 11/085
(Continued)

(56) References Cited

U.S. PATENT DOCUMENTS

| 4,938,303 A | * | 7/1990 | Schaal | ................... | B60K 11/02 |
| | | | | | 180/68.1 |
| 5,816,350 A | * | 10/1998 | Akira | ..................... | B60K 11/04 |
| | | | | | 180/68.1 |

(Continued)

FOREIGN PATENT DOCUMENTS

| CN | 1820998 A | 8/2006 |
| CN | 106103168 A | 11/2016 |

(Continued)

OTHER PUBLICATIONS

International Search Report and Written Opinion issued in corresponding International Patent Application No. PCT/EP2020/061034, mailed on Jul. 22, 2020 (13 pages).

(Continued)

*Primary Examiner* — Hau V Phan
(74) *Attorney, Agent, or Firm* — Osha Bergman Watanabe & Burton LLP (57) ABSTRACT

The present invention concerns a cooling assembly (100) for a motor vehicle, comprising at least one first heat exchanger (110) extending mainly in a first plane (PI), at least one second heat exchanger (120) extending mainly in a second plan (P2) and at least one protective grid (136) for protecting the second heat exchanger (120), the first heat exchanger (110) and/or the second heat exchanger (120) being carried by a frame (130), characterised in that the at least one protective grid (136) of the second heat exchanger (120) forms a one-piece part with the frame (130).

9 Claims, 3 Drawing Sheets

(58) Field of Classification Search
USPC .......................................................... 180/68.1
See application file for complete search history.

(56) References Cited

U.S. PATENT DOCUMENTS

| | | | | |
|---|---|---|---|---|
| 6,073,594 | A * | 6/2000 | Tsukiana | F28D 1/0435 |
| | | | | 123/41.55 |
| 6,131,681 | A * | 10/2000 | Nelson | B60K 11/08 |
| | | | | 180/68.1 |
| 6,182,744 | B1 * | 2/2001 | Nakamura | F28D 1/0417 |
| | | | | 62/509 |
| 7,314,106 | B2 * | 1/2008 | Rini | B60K 13/02 |
| | | | | 180/68.1 |
| 7,766,111 | B2 * | 8/2010 | Guilfoyle | B60K 11/085 |
| | | | | 296/180.5 |
| 8,162,087 | B2 * | 4/2012 | Kobayashi | B60K 11/08 |
| | | | | 165/47 |
| 8,936,121 | B2 * | 1/2015 | Vacca | B60K 11/04 |
| | | | | 165/44 |
| 9,080,307 | B2 * | 7/2015 | Numa | B60K 11/04 |
| 9,733,022 | B2 * | 8/2017 | Wilkins | F28D 1/0435 |
| 9,897,366 | B2 * | 2/2018 | Yahia | G05D 23/023 |
| 10,267,481 | B2 * | 4/2019 | Salter | F21S 45/48 |
| 2004/0188061 | A1 | 9/2004 | Beck et al. | |
| 2008/0246289 | A1 | 10/2008 | Skinner et al. | |

FOREIGN PATENT DOCUMENTS

| | | |
|---|---|---|
| CN | 106184404 A | 12/2016 |
| CN | 205768484 U | 12/2016 |
| EP | 2333266 A2 | 6/2011 |
| EP | 2896529 A1 | 7/2015 |
| FR | 3035955 A1 | 11/2016 |
| FR | 3041421 A1 | 3/2017 |
| FR | 3063338 A1 | 8/2018 |
| WO | 2019/043316 A1 | 3/2019 |

OTHER PUBLICATIONS

Office Action issued in counterpart Chinese Patent Application No. CN 202080042271.7 mailed Nov. 13, 2023 (38 pages).

* cited by examiner

COOLING ASSEMBLY FOR A MOTOR VEHICLE

FIELD OF THE INVENTION

The present invention relates to the field of cooling systems intended for motor vehicles and, more specifically, it relates to the cooling systems that are intended to be installed in the front face of motor vehicles.

BACKGROUND OF THE INVENTION

It is known that a motor vehicle comprises cooling systems that are intended to cool the heat engine or to cool batteries in the case of an electric vehicle, and that are also intended to thermally control the passenger compartment of the vehicle for the comfort of the passengers.

Such cooling systems conventionally comprise at least two heat exchangers arranged on a coolant circuit, with each heat exchanger being configured to allow calories to be exchanged between the heat transfer fluid circulating in and an air flow passing through the heat exchanger. This air flow can be generated, for example, by a motor-fan unit and/or by a movement of the vehicle. It is known for the relevant cooling system, or at least the heat exchangers of this cooling system, to be positioned in a front face of the vehicle, so that the air that reaches these heat exchangers, originating from outside the vehicle, is as fresh as possible. An opening is provided in the front face, particularly in the radiator grille of the vehicle, so that fresh air originating from outside the vehicle can enter the front face and pass through the cooling system.

It is particularly known for the exchangers to be disposed in a support frame that ensures the desired position of the exchangers relative to the front face and relative to each other, particularly in a longitudinal stacking position with a first heat exchanger disposed upstream of a second heat exchanger relative to the direction of circulation of the air flow entering the cooling system.

A disadvantage of this positioning in the front face lies in the fact that projections, for example, of gravel, can damage the heat exchangers, and particularly the first one, i.e. the heat exchanger of the cooling system arranged closest to a front end of the vehicle. Thus, it is known for a protective grid to be attached to the first heat exchanger in order to protect it against these possible projections, with this first heat exchanger for its part allowing the heat exchangers stacked behind it along the main direction of movement of the vehicle to be protected against these projections.

However, in order to ensure an at least partial supply of fresh air, i.e. of air that has never passed through any heat exchanger, both for the first heat exchanger and for the second heat exchanger, provision can be made for the second heat exchanger to be offset relative to the first heat exchanger, so that a portion of this second heat exchanger is no longer protected by the first heat exchanger. As a result, there is a risk of this portion of the second heat exchanger being damaged, which is not desirable.

SUMMARY OF THE INVENTION

The present invention falls within this context and aims to overcome at least the cited disadvantage by proposing a cooling assembly for a motor vehicle, comprising at least one first heat exchanger mainly extending in a first plane, at least one second heat exchanger mainly extending in a second plane and at least one protective grid for protecting the second heat exchanger, with the first heat exchanger and/or the second heat exchanger being supported by a frame. According to the invention, the at least one protective grid for protecting the second heat exchanger forms a one-piece part with the frame.

In other words, the protective grid for protecting the second heat exchanger and the frame form a single assembly that cannot be separated without damaging the protective grid or the frame. For example, the protective grid for protecting the second heat exchanger and the frame can be integrally formed or produced using a dual-injection system.

According to the invention, the first heat exchanger and the second heat exchanger have a similar, even identical, structure. In any case, the first heat exchanger and the second heat exchanger each comprise at least one heat exchange zone that comprises a stack of tubes or of plates, through which a fluid circulates that is capable of exchanging or of carrying calories. This heat exchange zone is also surrounded by two header boxes that are configured to allow fluid to enter, exit and/or be evenly distributed in the heat exchange zone.

According to one feature of the present invention, the first heat exchanger and the second heat exchanger are both passed through by the same air flow, with the first heat exchanger being arranged upstream of the second heat exchanger relative to a direction of circulation of this air flow, at least one portion of the second heat exchanger extends beyond the first heat exchanger in the second plane of main extension of the second heat exchanger. In other words, it is understood that the first heat exchanger is passed through by fresh air over its entire surface, whereas the second heat exchanger is passed through by fresh air only in the vicinity of the portion thereof that extends beyond the first heat exchanger, with the remainder of the second heat exchanger being passed through by air that has previously passed through the first heat exchanger, i.e. at least partially heated air.

According to the invention, the protective grid for protecting the second heat exchanger extends opposite the portion of the second heat exchanger that extends beyond the first heat exchanger. In other words, this protective grid is arranged so as to protect the portion of this second heat exchanger that extends beyond the first heat exchanger against any projections, such as projections of gravel that could damage this portion of the second heat exchanger. Thus, part of the second heat exchanger is protected by the first heat exchanger and another part of this second heat exchanger, more specifically the portion of this second heat exchanger that extends beyond the first heat exchanger for its part is protected by the protective grid.

Advantageously, the dimensions of the protective grid are at least identical to the dimensions of the portion of the second heat exchanger that extends beyond the first heat exchanger. It is understood that this allows the whole of this portion of the second heat exchanger to be protected, with the other portion of this second heat exchanger being protected by the first heat exchanger as stated above.

As previously stated, the second heat exchanger comprises a heat exchange zone formed by a stack of tubes or of plates, with this heat exchange zone being configured to be passed through by the air flow. According to one feature of the present invention, the protective grid comprises a plurality of bars that each extend opposite one of these tubes or one of these plates of the heat exchange zone of the second heat exchanger. Advantageously, each bar is arranged upstream of one of the tubes/plates relative to the direction of circulation of the air flow and the longest dimension of each bar is at least identical to the longest dimension of each tube or plate of the heat exchange zone of the second heat exchanger. In other words, each bar of the protective grid is intended to protect one of the tubes or one of the plates of the heat exchange zone of the second heat exchanger.

According to one embodiment of the present invention, the frame can comprise at least one attachment means configured to allow an air duct to be attached that is provided between a front face of the vehicle intended to accommodate the cooling assembly and the first heat exchanger. More specifically, this air duct then extends between an opening provided in the front face of the vehicle, so as to communicate with an environment outside the vehicle, and the first heat exchanger. It is understood that the air flow can reach the first and the second heat exchanger by virtue of this air duct. More specifically, the at least one attachment means is configured to allow one end of this air duct to be attached through which the air flow reaches the first and the second heat exchanger.

Optionally, the cooling assembly according to the invention comprises at least one means for protecting the first heat exchanger. According to the invention, this at least one means for protecting the first heat exchanger can assume the form of another grid. Alternatively, the tubes or the plates of the first heat exchanger, and more specifically the tubes or the plates that help to form the heat exchange zone of the first heat exchanger, can be reinforced to make them more resistant.

Advantageously, a first part of the first heat exchanger can be protected by the air duct, with a second part of the first heat exchanger then being protected by the at least one means for protecting the first heat exchanger. In order to fulfil its protection function, the air duct has, in the order in the direction of circulation of the air flow, an intake section extended by a progressive flare toward the first heat exchanger. Advantageously, this particular shape of the air duct allows at least some of any projections of gravel to be blocked, whilst ensuring a continuous air flow supply. In other words, it is understood that only part of the tubes/plates is reinforced or that the protective grid does not extend over the entire height of the first heat exchanger, with the term "height" being understood to be a dimension of the first heat exchanger measured perpendicular to the road on which the vehicle that the cooling assembly according to the invention is intended for moves.

According to one feature of the present invention, the frame comprises at least one central zone that extends in a third plane parallel to the first plane of main extension of the first heat exchanger and to the second plane of main extension of the second heat exchanger, with the protective grid for protecting the second heat exchanger forming part of this central zone.

The frame can comprise at least one first attachment bracket configured to allow the first heat exchanger to be attached and at least one second attachment bracket configured to allow the second heat exchanger to be attached, the at least one first attachment bracket and the at least one second attachment bracket being distributed on either side of the central zone of the frame. In other words, the central zone helps to define a first side of the frame, in which the first heat exchanger is attached, and a second side of the frame, in which the second heat exchanger is attached, with the central zone of the frame thus being interposed between the first heat exchanger and the second heat exchanger.

According to the invention, the central zone of the frame can comprise at least two reinforcements, with the first heat exchanger and the second heat exchanger both being arranged opposite these reinforcements. It is understood that the first heat exchanger is then arranged opposite a first face of these reinforcements and that the second heat exchanger for its part is arranged opposite a second face of these reinforcements, with the first faces of these reinforcements being turned toward the first side of the frame and the second faces of these reinforcements being turned toward the second side of the frame.

Optionally, provision can be made for the first heat exchanger and the second heat exchanger to be arranged in abutment against these reinforcements. According to this alternative, the first heat exchanger is then in abutment on the first faces of these reinforcements and the second heat exchanger for its part is in abutment on the second faces of these reinforcements.

According to one embodiment of the present invention, the frame comprises at least two vertical rails that are parallel to each other and at least two horizontal rails that are parallel to each other and perpendicular to the vertical rails. According to this embodiment, the protective grid for protecting the second heat exchanger extends from one of the vertical rails to the other. Advantageously, according to this embodiment, the protective grid for protecting the second heat exchanger is a horizontal grid, which extends parallel to the horizontal rails of the frame. Still according to this embodiment, the two reinforcements of the frame are vertical reinforcements, i.e. they extend parallel to the vertical rails of the frame and thus perpendicular to the protective grid for protecting the second heat exchanger.

According to the invention, the protective grid for protecting the second heat exchanger, the frame and the two reinforcements can form a one-piece assembly, i.e. a single assembly that cannot be separated without damaging the protective grid for protecting the second heat exchanger, the frame or the reinforcements. In other words, there is a continuous amount of material between the protective grid for protecting the second heat exchanger and the reinforcements of the frame.

The present invention also relates to a motor vehicle comprising at least one front face and at least one cooling assembly according to the invention, the cooling assembly being arranged in the front face of the vehicle.

BRIEF DESCRIPTION OF THE DRAWINGS

Further features, details and advantages will become more clearly apparent from reading the detailed description, which is provided hereafter for information purposes and with reference to the various embodiments illustrated in the following figures.

DETAILED DESCRIPTION

Throughout the remainder of the description, the terms "upstream" and "downstream" refer to a direction of circulation of an air flow that enters a vehicle via its front face, for example, when this vehicle moves forward. The "longitudinal" cross-sections are cross-sections produced in a plane that is perpendicular to a road on which the vehicle moves and that includes a main direction of movement D of the vehicle. The terms "front" and "rear" for their part refer to an orientation of the vehicle and denote two longitudinal ends of this vehicle, with the front of the vehicle comprising the front face that integrates a cooling assembly according to the present invention. Finally, the terms "vertical" and "horizontal" are understood relative to the road on which the relevant vehicle moves, with a horizontal direction being parallel to the road and a vertical direction being perpendicular to this road.

Figure 1:
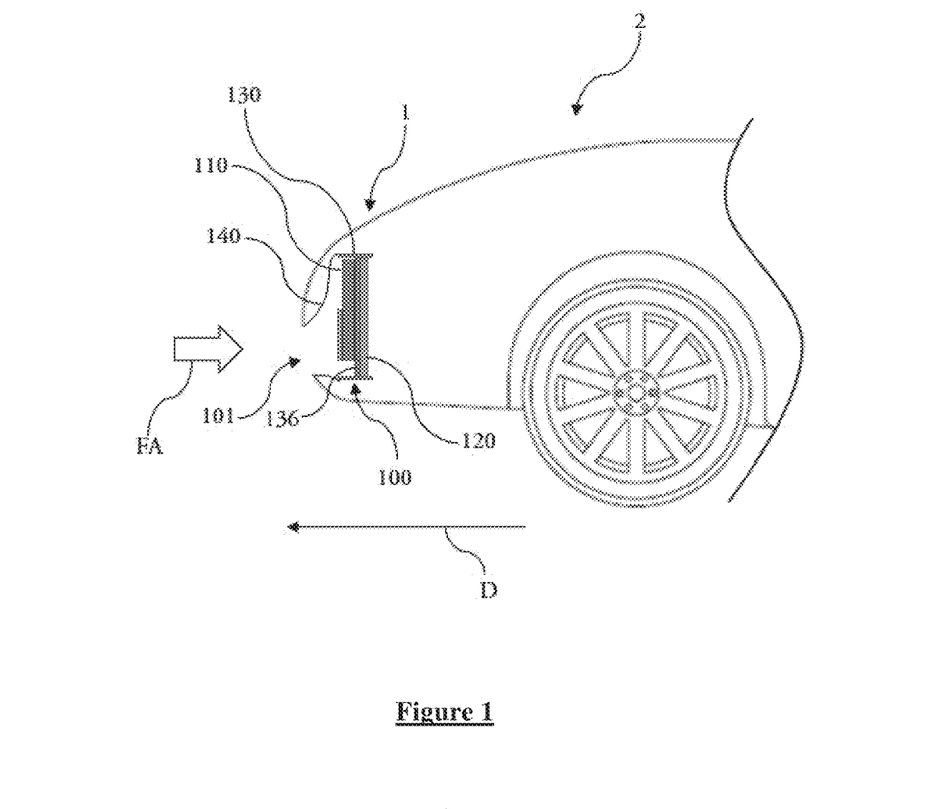
FIG. 1 schematically illustrates, shown as a longitudinal cross-section, a front face of a vehicle, in which front face a cooling assembly according to the invention is integrated.

FIG. 1 schematically illustrates, as a longitudinal cross-section, a front face 1 of a motor vehicle 2, in which front face a cooling assembly 100 according to the present invention is arranged.

The cooling assembly 100 comprises at least one first heat exchanger 110, at least one second heat exchanger 120, at least one frame 130 supporting the first heat exchanger 110 and the second heat exchanger 120, and at least one air duct 140 arranged between an opening 101 provided in the front face 1 of the vehicle 2 and the first heat exchanger 110 of the cooling assembly 100.

As illustrated, the first heat exchanger 110 and the second heat exchanger 120 are stacked, in this order, along a main direction of movement D of this vehicle 2. The first heat exchanger 110 and the second heat exchanger 120 are arranged, for example, on a circuit for distributing a heat transfer fluid or a coolant. A "heat transfer fluid" is understood to be a fluid capable of carrying, capturing and releasing calories and a "coolant" is understood to be a fluid capable of capturing and releasing calories by changing state. The first heat exchanger 110 and the second heat exchanger 120 are also configured to exchange heat between this coolant or this heat transfer fluid and an air flow AF that enters the vehicle 2, with this air flow AF being able to be generated by a movement of the vehicle 2 and/or by a ventilation component arranged upstream or downstream of the first heat exchanger 110 and of the second heat exchanger 120. It should be noted that, relative to a direction of circulation of this air flow AF, the first heat exchanger 110 is arranged upstream of the second heat exchanger 120. In other words, the first heat exchanger 110 is only supplied with fresh air, whereas the second heat exchanger 120 is at least partially supplied with heated air, i.e. air that has already passed through the first heat exchanger 110 and has therefore exchanged calories with the fluid circulating therein.

It is understood that the opening 101 provided in the front face 1 of the vehicle 2 allows the air flow AF to enter the vehicle 2. Optionally, this opening 101 can be provided with adjustable flaps that allow the amount of air that enters the vehicle 2 to be controlled. Thus, depending on the cooling requirements of the vehicle 2 at a given instant, these adjustable flaps are more or less open or are fully closed. It is then understood that the air duct 140 is arranged between these adjustable flaps and the first heat exchanger 110 and that it allows the air flow AF to be routed from an environment outside the vehicle 2 to the first and second heat exchangers 110, 120.

The cooling assembly 100 according to the invention also comprises at least one protective grid 136 for protecting the second heat exchanger 120 that allows, as will be described in further detail hereafter, this second heat exchanger 120 to be protected against any projections, for example, projections of gravel present on the road on which the vehicle 2 moves, which could enter the vehicle 2 via the opening 101 and damage this second heat exchanger 120.

Figure 2:
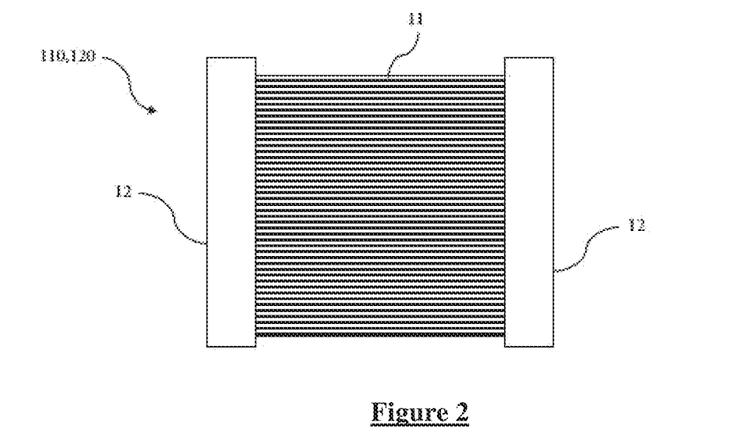
FIG. 2 schematically illustrates a heat exchanger of the cooling assembly according to the invention.

The first heat exchanger 110 and the second heat exchanger 120 advantageously have similar structures. An embodiment of these first and second heat exchangers 110, 120 is schematically shown in FIG. 2, for example. Thus, each of these heat exchangers 110, 120 comprises a heat exchange zone 11 formed by a stack of tubes or of plates, in or through which the coolant or the heat transfer fluid circulates. This heat exchange zone 11 is surrounded by at least two header boxes 12 that allow the coolant or the heat transfer fluid to reach and to leave this heat exchange zone 11. Advantageously, at least one of these header boxes 12 is configured to allow the fluid to be evenly distributed through the heat exchange zone 11. This heat exchange zone 11 is also intended to be passed through by the air flow that enters the vehicle, so that the exchange of calories between the air flow and the fluid circulating therein occurs in this heat exchange zone 11. According to the example illustrated herein, the header boxes 12 are distributed at two opposite ends of the heat exchange zone 11, but it is understood that this is only one embodiment and that other configurations can be contemplated without departing from the scope of the present invention. For example, provision can be made for these two header boxes to be arranged at the same end of the heat exchange zone, with the fluid then circulating therein in a U-shaped circuit.

Figure 3:
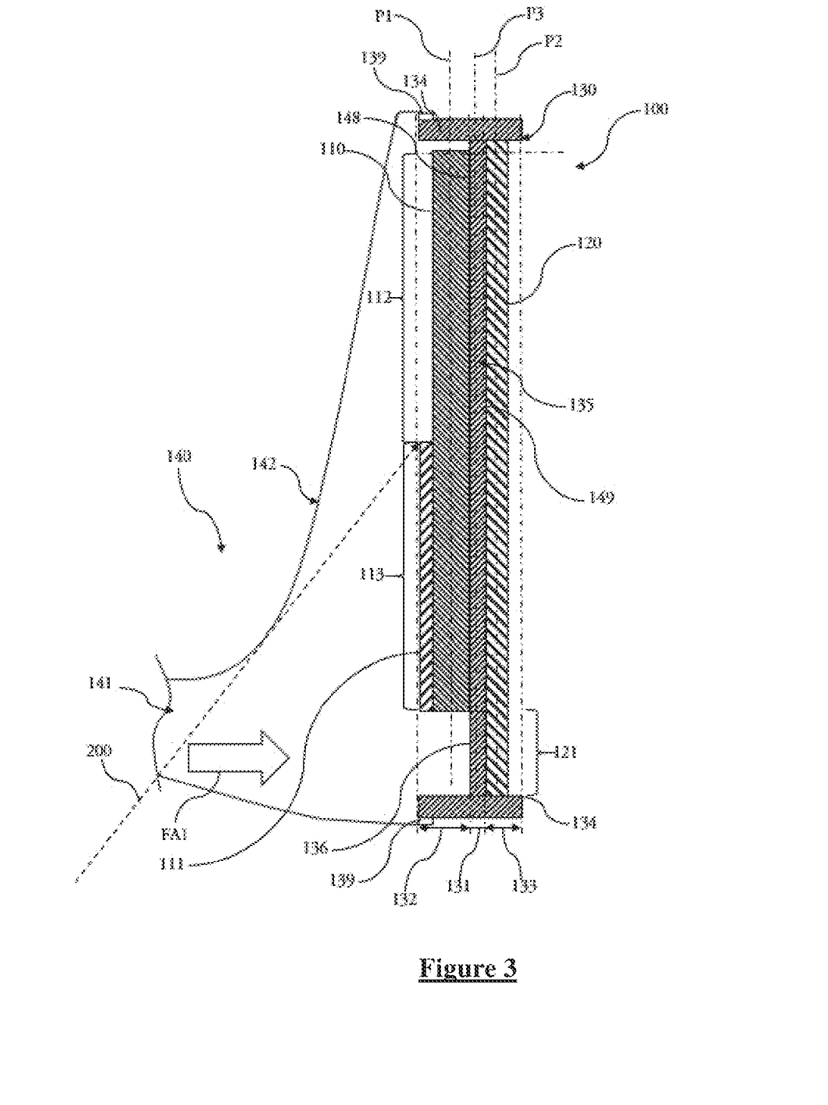
FIG. 3 schematically illustrates, shown as a longitudinal cross-section, the cooling assembly according to the present invention.

FIG. 3 schematically illustrates, shown as a longitudinal cross-section, the cooling assembly 100 according to one embodiment of the present invention. As illustrated, the first heat exchanger 110 and the second heat exchanger 120 respectively extend in a first plane P1 and in a second plane P2 parallel to each other.

As previously stated, it should be noted that the frame 130 supports both the first heat exchanger 110 and the second heat exchanger 120. More specifically, the frame 130 has a central zone 131 that mainly extends in a third plane P3 parallel to the first plane P1 of main extension of the first heat exchanger 110 and to the second plane P2 of main extension of the second heat exchanger 120 and that defines a first side 132 of the frame 130, on which side the first heat exchanger 110 is attached, and a second side 133 of the frame 130, on which side the second heat exchanger 120 is attached. In other words, the first heat exchanger 110 and the second heat exchanger 120 are distributed on either side of the central zone 131 of the frame 130, i.e. this central zone 131 is interposed between the first heat exchanger 110 and the second heat exchanger 120.

Figure 4:
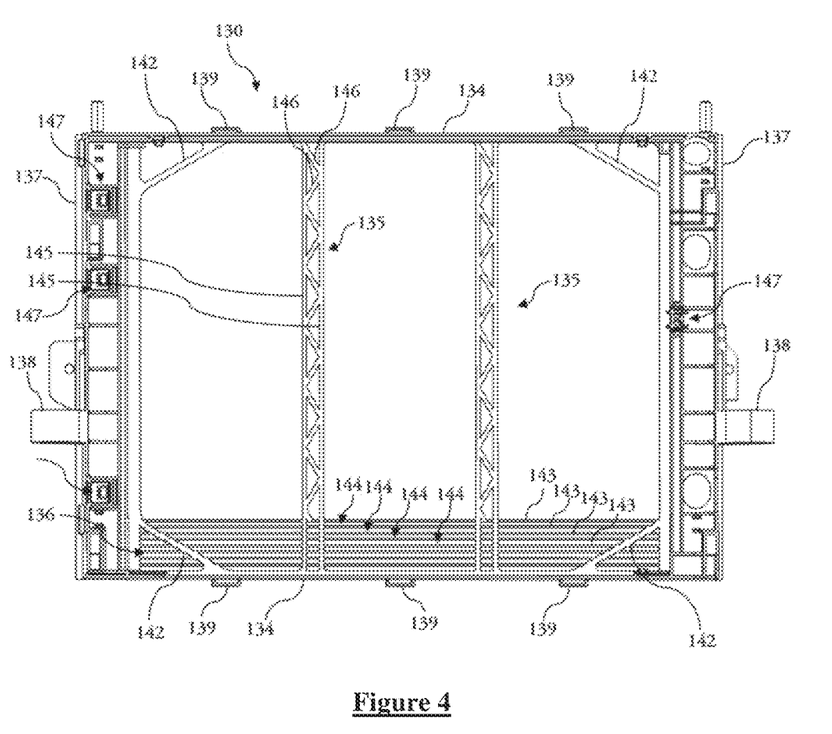
FIG. 4 illustrates, as a front view, a frame of the cooling assembly according to the invention, on which frame at least one heat exchanger of the cooling assembly is intended to be attached.

The frame 130 also comprises at least two horizontal rails 134 and at least two vertical rails, for example, shown in FIG. 4, with the two horizontal rails 134 being parallel to each other and perpendicular to the two vertical rails, with these two vertical rails thus also being parallel to each other.

The frame 130 also comprises at least two reinforcements 135, only one of which is shown in FIG. 3 and which extend from one horizontal rail 134 to the other, perpendicular to these horizontal rails 134. It should be noted that, in FIG. 3, these reinforcements 135 are more specifically provided in the central zone 131 of this frame 130. According to the invention, the first heat exchanger 110 is thus arranged opposite a first face 148 of these reinforcements 135 and the second heat exchanger 120 is arranged opposite a second face 149 of these reinforcements 135, with the first face 148 of each reinforcement 135 being turned toward the first side 132 of the frame 130 and the second face 149 of these reinforcements 135 for its part being turned toward the second side 133 of this frame 130. Optionally, the first heat exchanger can be arranged in abutment against the first faces 148 of each reinforcement 135 and the second heat exchanger for its part can be arranged in abutment against the second faces 149 of these reinforcements 135.

The frame 130 also supports the air duct 140, i.e. the frame 130, and more specifically the horizontal rails 134 of this frame 130, each have at least one attachment means 139 intended to engage with one end of the air duct 140 so as to hold said air duct in position.

It also should be noted that the second heat exchanger 120 comprises at least one portion 121 that extends beyond the first heat exchanger 110, in the second plane P2 in which the second heat exchanger 120 mainly extends. According to the example illustrated herein, this portion 121 of the second heat exchanger 120 extends beyond the first heat exchanger 110, downward, i.e. toward the road when the cooling assembly 100 is integrated in the vehicle, but it is understood that this is only one embodiment of the present invention and that the portion 121 of the second heat exchanger 120 could extend in any other direction without departing from the scope of the present invention, provided that it extends in the second plane P2 of main extension of this second heat exchanger 120. Advantageously, this portion 121 of the second heat exchanger 120 is thus arranged to allow this second heat exchanger 120 to be at least partially supplied with fresh air, i.e. by a portion AF1 of the air flow that has not yet passed through any other heat exchanger and that therefore has not exchanged calories with the fluid. In other words, this portion 121 of the second heat exchanger 120 that extends beyond the first heat exchanger 110 allows a temperature difference to be increased between the fluid that circulates in the heat exchange zone of the second heat exchanger 120 and the air flow that passes through the second heat exchanger so as to improve the efficiency of this second heat exchanger 120.

As stated above, gravel or other elements present on the road can be projected into the cooling assembly 100 and can damage the first heat exchanger 110 and/or the second heat exchanger 120. More specifically, these projections risk damaging the first heat exchanger 110 and the portion 121 of the second heat exchanger 120 that extends beyond the first heat exchanger 110. According to the invention, the cooling assembly 100 advantageously comprises at least one means 111 for protecting the first heat exchanger 110. Since the second heat exchanger 120 is stacked on the first heat exchanger 110, it is understood that this second heat exchanger 120 is partially protected against projections by the first heat exchanger 110.

In order to protect the portion 121 of the second heat exchanger 120 that extends beyond the first heat exchanger 110, the cooling assembly 100 according to the invention comprises a protective grid 136 arranged opposite this portion 121 of the second heat exchanger 120. As will be described in further detail hereafter, this protective grid 136 forms a one-piece assembly with the frame 130 supporting the heat exchangers 110, 120, i.e. the frame 130 and the protective grid 136 form a single assembly that cannot be separated without damaging the protective grid 136 or the frame 130. Advantageously, the dimensions of the protective grid 136 are at least identical to the dimensions of the portion 121 of the second heat exchanger 120 that extends beyond the first heat exchanger 110, so that the whole of this portion 121 of the second heat exchanger 120 is effectively protected.

The cooling assembly 100 according to the invention thus comprises at least one means 111 for protecting the first heat exchanger 110. According to the example illustrated in FIG. 3, this protective means 111 assumes the form of another grid. This other grid differs from the protective grid 136 for protecting the second heat exchanger 120 particularly in that it is produced separately and is fitted onto the frame 130 or directly onto the first heat exchanger 110. In other words, the frame 130 or the first heat exchanger 110 comprises at least one attachment component, not illustrated herein, that allows this other grid to be attached opposite the first heat exchanger 110 so as to protect said heat exchanger from the aforementioned projections. According to an example that is not illustrated herein, the means 111 for protecting the first heat exchanger 110 are formed by a reinforcement of the tubes or of the plates that form the heat exchange zone of this first heat exchanger 110.

As shown in FIG. 3, the air duct 140 has, in this order in the direction of circulation of the air flow, an intake section 141 extended by a progressive flare 142 toward the first heat exchanger 110. This particular shape advantageously allows part of the first heat exchanger 110 to be protected without needing to add any protective means.

Thus, as illustrated in FIG. 3, it should be noted that a projection with a trajectory 200 that is tangent to the air duct 140 is deflected by the means 111 for protecting the first heat exchanger 110 and, more specifically, by a peak of this protective means 111, i.e. by part of this protective means 111 furthest away from the road on which the vehicle moves. In other words, any projection that reaches the air duct 140, and for which the trajectory is likely to cross the first heat exchanger 110, is deflected either by the means 111 for protecting the first heat exchanger 110 or by the air duct 140 itself, thus preserving the integrity of the first heat exchanger 110 without hindering the passage of the air flow. Advantageously, this particular shape of the air duct 140, with a reduced intake section forming a constriction and a progressive flare in the continuous whole, allows the dimensions of the means 111 for protecting the first heat exchanger 110 to be reduced. As shown, the first heat exchanger 110 therefore comprises a first part 112, which is protected against any projections by the air duct 140, and a second part 113, which for its part is protected against any projections by the other grid or by a reinforcement of the tubes or of the plates forming the heat exchange zone of this first heat exchanger.

According to the example illustrated in FIG. 3, the protective grid 136 for protecting the second heat exchanger 120 helps to form the central zone 131 of the frame 130. In other words, according to this example, this protective grid 136 extends in the extension of the reinforcements 135 and it is thus arranged downstream of the first heat exchanger 110 and upstream of the second heat exchanger 120. However, this example is not limiting and provision can be made, for example, for the protective grid to be brought forward relative to the second heat exchanger and thus, for example, to be positioned in the extension of the means for protecting the first heat exchanger, i.e. upstream both of this first heat exchanger and of the second heat exchanger.

Finally, FIG. 4 illustrates, as a front view, an embodiment of the frame 130 that supports the heat exchangers of the cooling assembly according to the invention.

As stated above, the frame 130 comprises at least two horizontal rails 134 and at least two vertical rails 137. According to an example illustrated in this FIG. 4, the horizontal rails 134 are longer than the vertical rails 137, so that the frame 130 has a general rectangular shape. Of course, this is only one embodiment that cannot limit the invention. The vertical rails 137 support attachment elements 138 configured to allow the frame 130 to be attached to the front face of the vehicle, as illustrated in FIG. 1. These vertical rails 137 also each support at least one attachment bracket 147 configured to allow the first heat exchanger or the second heat exchanger to be attached to the relevant side of the frame 130.

Each horizontal rail 134 supports at least one of the attachment means 139 that allow the air duct to be attached to the frame 130, as previously described. According to the example illustrated herein, each horizontal rail 134 has three means 139 for attaching the air duct that are evenly distributed along the relevant horizontal rail 134.

Furthermore, the frame 130 comprises the aforementioned reinforcements 135 and, more specifically, two reinforcements 135, which extend between the two horizontal rails 134, perpendicular to these horizontal rails 134. In other words, these two reinforcements 135 are vertical reinforcements. It is understood that this is only one embodiment, and that these two reinforcements 135 could have a different orientation without departing from the scope of the present invention. As stated above with reference to FIG. 3, these reinforcements 135 are arranged in the central zone of the frame 130. This central zone of the frame 130 also comprises stiffening components 142, which respectively extend between an adjacent vertical rail 137 and horizontal rail 134. According to the example illustrated in FIG. 4, the frame 130 comprises four stiffening components 142 respectively arranged at each corner of the frame 130, i.e. at each junction between a vertical rail 137 and a horizontal rail 134. These stiffening components 142 stiffen the structure of the frame 130, i.e. they make it more resistant to the mechanical stresses that it is subjected to during its use, with these mechanical stresses particularly being due to the movements of the vehicle in which the cooling assembly according to the invention is intended to be integrated.

As previously stated, the frame 130 also comprises the protective grid 136 for protecting the second heat exchanger and, more specifically, the protective grid 136 for protecting the portion of the second heat exchanger that extends beyond the first heat exchanger. The protective grid 136 forms a one-piece assembly with the frame 130. Advantageously, provision can be made for the vertical reinforcements 135, the horizontal rails 134, the vertical rails 137 and the stiffening components 142 to also form, with the frame 130 and the protective grid 136, a one-piece assembly, i.e. a single assembly that cannot be separated without damaging at least one of these elements. According to one embodiment of the present invention, the reinforcements 135, the horizontal and vertical rails 134, 137, the stiffening components 142 and the protective grid 136 for protecting the second heat exchanger are integrally formed, i.e. these elements are produced from a single material. Alternatively, the protective grid 136 for protecting the second heat exchanger can be produced from a different material, with the frame 130 then being produced, for example, using a dual-injection molding method. It is understood that these are only embodiments and that any other method that could produce a one-piece frame 130, as described herein, can be contemplated without departing from the scope of the present invention.

The protective grid 136 for protecting the second heat exchanger is formed, according to the example illustrated in FIG. 4, by a plurality of horizontal bars 143, i.e. bars 143 that extend parallel to the horizontal rails 134 of the frame 130, separated from each other by spaces 144. As shown, these bars 143 are thus parallel to each other and extend from one of the vertical rails 137 to the other. Advantageously, the dimension of each bar 143 is equivalent, or substantially equivalent, to a dimension of the tubes or of the plates that form the heat exchange zone of the second heat exchanger and the dimensions of the spaces 144 provided between these bars 143 for their part are equivalent, or substantially equivalent, to the dimensions of the spaces provided between these tubes or these plates of the second heat exchanger. In this way, each bar 143 of the protective grid 136 is arranged opposite one of these tubes or plates of the second heat exchanger and, more specifically, upstream thereof in order to effectively protect them against any projections that could damage them.

As previously stated, the vertical reinforcements 135 for their part extend from one of the horizontal rails 134 to the other one of these horizontal rails 134. These two reinforcements 135 are identical and respectively comprise two parallel vertical beams 145 that are connected together by cross-members 146, thus forming a lattice. Since these reinforcements 135 are identical, the reference signs on one are directly applicable to the other. However, it should be noted that the cross-members 146 do not extend over the entire height of the vertical beams 145, with the term "height" in this case having to be understood to be the largest dimension of these vertical beams 145. Thus, the reinforcements 135 are devoid of cross-members 146 at the protective grid 136. However, the vertical beams 145 of these reinforcements 135 form bridges of material between the bars 143 of the protective grid 136.

Two stiffening components 142 also extend through the protective grid 136, thus forming other bridges of material between the bars 143 of this protective grid 136.

It is understood from the above that the reinforcements 135 and the stiffening components 142 of the frame 130 advantageously allow the structure of the protective grid 136 to be reinforced, with this protective grid 136 for its part also stiffening the overall structure of the frame 130.

Thus, the present invention proposes a simple and inexpensive means for effectively protecting the heat exchangers of a cooling assembly that is arranged in the front face of a vehicle and therefore that is subject to any projections, for example, of gravel or of other elements that can be on the road and can be projected by the movement of the vehicle that integrates such a cooling assembly.

However, the present invention is not limited to the means and configurations described and illustrated herein and it also extends to all equivalent means and configurations and to any technically functional combination of such means. In particular, the shape and the arrangement of the protective grid, of the frame, of the first heat exchanger and of the second heat exchanger can be modified without detriment to the invention, provided that they fulfil the functionalities described and illustrated in the present document.

The invention claimed is:

1. A cooling assembly for a motor vehicle, comprising:
at least one first heat exchanger mainly extending in a first plane;
at least one second heat exchanger mainly extending in a second plane; and
at least one protective grid for protecting the second heat exchanger, the first heat exchanger and/or the second heat exchanger being supported by a frame,
wherein the at least one protective grid for protecting the second heat exchanger is disposed between the first heat exchanger and the second heat exchanger, and forms a one-piece part with the frame, and
wherein the frame comprises at least one central zone that extends in a third plane parallel to the first plane of main extension of the first heat exchanger and to the second plane of main extension of the second heat exchanger, with the protective grid for protecting the second heat exchanger forming part of this central zone.

2. The cooling assembly as claimed in claim 1, wherein the first heat exchanger and the second heat exchanger are both passed through by the same air flow, the first heat exchanger being arranged upstream of the second heat exchanger relative to a direction of circulation of this air flow, wherein at least one portion of the second heat exchanger extends beyond the first heat exchanger in the second plane of main extension of the second heat exchanger and wherein the protective grid for protecting the second heat exchanger extends opposite the portion of the second heat exchanger that extends beyond the first heat exchanger.

3. The cooling assembly as claimed in claim 2, wherein the dimensions of the protective grid are at least identical to the dimensions of the portion of the second heat exchanger that extends beyond the first heat exchanger.

4. The cooling assembly as claimed in claim 2, wherein at least the second heat exchanger comprises a heat exchange zone formed by a stack of tubes or of plates, with this heat exchange zone being configured to be passed through by the air flow and wherein the protective grid comprises a plurality of bars that each extend opposite one of these tubes or one of these plates of the heat exchange zone of the second heat exchanger.

5. The cooling assembly as claimed in claim 1, comprising at least one means for protecting the first heat exchanger.

6. The cooling assembly as claimed in claim 1, wherein the frame comprises at least one first attachment bracket configured to allow the first heat exchanger to be attached and comprises at least one second attachment bracket configured to allow the second heat exchanger to be attached, the at least one first attachment bracket and the at least one second attachment bracket being distributed on either side of the central zone of the frame.

7. The cooling assembly as claimed in claim 1, wherein the central zone of the frame comprises at least two reinforcements, the first heat exchanger and the second heat exchanger both being arranged opposite these reinforcements.

8. The cooling assembly as claimed in claim 7, wherein the protective grid for protecting the second heat exchanger, the frame and the two reinforcements form a one-piece assembly.

9. A motor vehicle comprising at least one front face and at least one cooling assembly as claimed in claim 1, the cooling assembly being arranged in the front face of the vehicle.

* * * * *